(12) United States Patent
Willig

(10) Patent No.: US 6,959,131 B2
(45) Date of Patent: Oct. 25, 2005

(54) ACHROMATIC FIBER-OPTIC POWER SPLITTER AND RELATED METHODS

(75) Inventor: Reinhardt L. Willig, Maynard, MA (US)

(73) Assignee: Charles Stark Draper Laboratory, Inc., Cambridge, MA (US)

(*) Notice: Subject to any disclaimer, the term of this patent is extended or adjusted under 35 U.S.C. 154(b) by 143 days.

(21) Appl. No.: 10/712,177

(22) Filed: Nov. 13, 2003

(65) Prior Publication Data

US 2005/0185888 A1  Aug. 25, 2005

Related U.S. Application Data

(60) Provisional application No. 60/426,987, filed on Nov. 15, 2002.

(51) Int. Cl.[7] ............................. G02B 6/26; C03B 37/15
(52) U.S. Cl. .............................. 385/43; 385/42; 385/45; 385/46; 385/50; 385/96; 385/98; 385/99; 385/31; 65/406; 65/407; 65/408; 65/410
(58) Field of Search ............................... 385/43, 42, 45, 385/46, 50, 96, 98, 99, 31; 65/406, 407, 408, 65/410

(56) References Cited

U.S. PATENT DOCUMENTS

| | | | |
|---|---|---|---|
| 4,008,061 A | 2/1977 | Ramsay ............................ 65/4 |
| 4,204,852 A | 5/1980 | Watts et al. ...................... 65/4 |
| 4,392,712 A | 7/1983 | Ozeki ......................... 385/42 X |
| 4,487,477 A | 12/1984 | Helms et al. ................. 350/172 |
| 4,490,163 A | 12/1984 | Jochem et al. ................. 65/4.21 |
| 4,632,513 A * | 12/1986 | Stowe et al. .................... 216/24 |
| 4,763,272 A * | 8/1988 | McLandrich ................ 700/117 |
| 4,772,085 A * | 9/1988 | Moore et al. .................. 385/43 |
| 4,902,323 A | 2/1990 | Miller et al. ................. 65/3.11 |
| 4,920,366 A | 4/1990 | Bowen et al. ............ 385/53 X |
| 4,979,972 A | 12/1990 | Berkey et al. ................. 65/4.2 |
| 5,044,716 A | 9/1991 | Berkey ......................... 385/51 |
| 5,138,676 A * | 8/1992 | Stowe et al. .................. 385/32 |
| 5,297,233 A | 3/1994 | Lerminiaux ................... 385/27 |
| 5,408,556 A | 4/1995 | Wong ........................... 385/48 |
| 5,410,626 A | 4/1995 | Okuta et al. .................... 385/43 |
| 5,452,393 A * | 9/1995 | Stowe et al. ................. 385/123 |
| RE35,138 E | 1/1996 | Weidman ..................... 385/42 |
| 5,664,037 A | 9/1997 | Weidman ..................... 385/46 |
| 5,710,848 A * | 1/1998 | Dumais et al. ............... 385/43 |
| 5,923,470 A | 7/1999 | Pan et al. ..................... 395/495 |
| 6,325,883 B1 * | 12/2001 | Backer et al. ........... 156/275.5 |
| 6,341,503 B1 * | 1/2002 | Miller et al. .................. 65/387 |

(Continued)

FOREIGN PATENT DOCUMENTS

EP  0 527 427 B1  11/1995  ............... 385/42 X

OTHER PUBLICATIONS

Bahrampour et al., "Theoretical Analysis of Spectral Hole Burning and Relaxation Oscillation in All-Optical Gain Stabilized Multichannel Erbuim-Doped Fiber Amplifier (EDFA)," Journal of Lightwave Technology, 19 (8), Aug. 2001, pp. 1130-1139.

(Continued)

Primary Examiner—Brian M. Healy
(74) Attorney, Agent, or Firm—Goodwin Procter LLP

(57) ABSTRACT

An achromatic power splitter is formed from multiple optical fibers. The achromatic power splitter operates single mode, which permits the power splitter to operate substantially insensitive to changes in wavelength of the input light, to changes in the polarization of the input light, to changes in the temperature of the device, and to exposure to ionizing radiation.

28 Claims, 7 Drawing Sheets

U.S. PATENT DOCUMENTS

| | | | |
|---|---|---|---|
| 6,370,919 B1 | 4/2002 | Kossat et al. | 65/381 |
| 6,406,197 B1 | 6/2002 | Okuda et al. | 385/96 |
| 6,434,302 B1 * | 8/2002 | Fidric et al. | 385/43 |

OTHER PUBLICATIONS

Barron et al., "Multimode power combiners pump up," Photonics Spectra, Jan. 2002, pp. 153, 154, 156, 158.

Berger et al., "Combining up to eight telescope beams in a single chip," 2000, 10 pages.

Booysen et al., "Wavelength insensitive fiber optic sensor based on an axially strained fused coupler," SPIE, 2070, Fiber Optic and Laser Sensors XI, 1993, pp. 322-332.

El-Sabban et al., "Design of an integrated optical magic T for astronomy applications," Applied Optics, 39 (36), Dec. 20, 2000, pp. 6781-6786.

Gadonna et al., "Reliability Evaluation for PON Power Splitters," SPIE, 2290, Jul. 1994, pp. 170-184.

Grant et al., "Low-cost $M \times N$ couplers in silica-on-silicon for passive optical networks," International Journal for Optoelectronics, 9 (2), 1994, pp. 159-170.

Hanafusa et al., "Wavelength-flattened couplers fabricated from single-mode fibers with different core parameters," Optical Fibers Sensors, Springer Proceedings in Physics, 44, 1989, pp. 334-338.

Hussey et al., "Fabrication of wavelength-flattened tapered couplers using polishing for cladding removal," Electronics Letters, 24 (17), Aug. 18, 1988, pp. 1072-1073.

Ilev et al., "High efficiency wideband beam-splitter mirror for optical fibre reflectometry," International Journal of Optoelectronics, 9 (3), 1994, pp. 285-287.

Izutsu et al., "Operation mechanism of the single-mode optical-waveguide Y junction," Optics Letters, vol. 7 (3), Mar. 1982, pp. 136-138.

Kern et al., "Planar Integrated Optics contribution in instrumentation for interferometry," 2000, 12 pages.

Kishioka, "A Design Method To Achieve Wide Wavelength-Flattened Responses in the Directional Coupler-Type Optical Power Splitters," Journal of Lightwave Technology, 19 (11), Nov. 2001, pp. 1705-1715.

Lee, "A Research Paper on Erbium Doper Fiber Amplifiers," http://www.jps.net/hansel/erbium, 1996, 8 pages.

Little et al., "Design Rules for Maximally Flat Wavelength-Insensitive Optical Power Dividers Using Mach-Zehnder Structures," IEEE Photonics Technology Letters, 9 (12), Dec. 1997, pp. 1607-1609.

Luo et al., "Experimental and Theoretical Analysis of Relaxation-Oscillations and Spectral Hole Burning Effects in All-Optical Gain-Clamped EDFA's for WDM Networks," Journal of Lightwave Technology, 16 (4), Apr., 1998, pp. 527-533.

Moore et al., "Optimization of Tap Couplers Made by the FBT Process," http://www.gouldfo.com/tech/MADRAS.pdf), 6 pages.

Neyer et al., "A Beam Propagation Method Analysis of Active and Passive Waveguide Crossings." Journal of Lightwave Technology, LT-3 (3), Jun. 1985, pp. 635-642.

Nolan, "Tapered-fiber couplers, MUX and DEMUX," Handbook of Optics, IV, Chapter 8, 10 pages.

Oakley et al., "Loss and spectral control in fused tapered couplers," Optical Engineering, 33 (12), Dec. 1994, pp. 4006-4019.

Okamoto, "Theoretical Investigation of Light Coupling Phenomena in Wavelenght-Flattened Couplers," Journal of Lightwave Technology, 8 (5), May 1990, pp. 678-683.

Orta et al., "A design technique for wideband optical couplers," SPIE, 2449, pp. 375-383.

O'Sullivan et al., "Truly wavelength-flattened monolithic couplers," Electronics Letters, 33 (4), Feb. 13, 1997, pp. 321-322.

Rajaram et al., "Intelligent EDFAs are essential for metro networks," http://lw.pennet.com/Articles/Article$_{13}$ Display.cfm?Section=OnlineArticle&Su, 3 pages.

Takagi et al., "Silica-Based Waveguide-Type Wavelength-Insensitive Couplers (WINC's) With Series-Tapered Coupling Structure," Journal of Lightwave Technology, 10 (12), Dec. 1992, pp. 1814-1824.

Tekippe et al., "Production, performance and reliability of fused couplers," pp. 1-6.

Weidman et al., "Fiber-based, slope adjustable filter elements provide EDFA gain tilt-control," Turn of the Volume, Guidelines, Corning, Summer 2001, 2 pages.

Witte et al., "Branching elements for optical data buses," Applied Optics, 20 (4), Feb. 15, 1981, pp. 715-718.

Yanagawa et al., "Silica-based star-coupler planar lightwave circuit for passive double-star network," International Journal of Optoelectronics, 9 (2), 1994, pp. 151-158.

Profiles of selected companies: Gould Electronics Inc.: products in the marketplace; strategies,: http://www.dialogselect.com/business, Feb. 1995, 1 page.

"Wavelength Flattened Couplers," http://www.gouldfo.com/products/, 2 pages.

"Single Window Tap Couplers<10% Coupling Radio," http://www.gouldfo.com/products/, 7 pages.

"Fiber optic beam splitters/combiners," OZ Optics Ltd., Sep. 1999, pp. 1-5.

"Fused fiber optic couplers," OZ Optics Ltd., Sep. 1999, 2 pages.

"Erbium Doped Fiber Amplifier," ADVA Optical Service & Solutions, 2 pages.

Geoff, "Semiconductor Optical Amplifiers," Fiber Optic Reference Guide, excerpt for Chapter 7, 1999, pp. 81-83, 88.

"Optical Fiber Amplifiers: Gain And Noise Figure," Hewlett-Packard, pp. 67-86.

"Polka dot beamsplitters," Thermo Oriel, http://www.thermo.com/, 2 pages.

"Polka-dot beamsplitters," Edmund Industrial Optics, http://www.edmundoptics.com/, 2001, 2 pages.

* cited by examiner

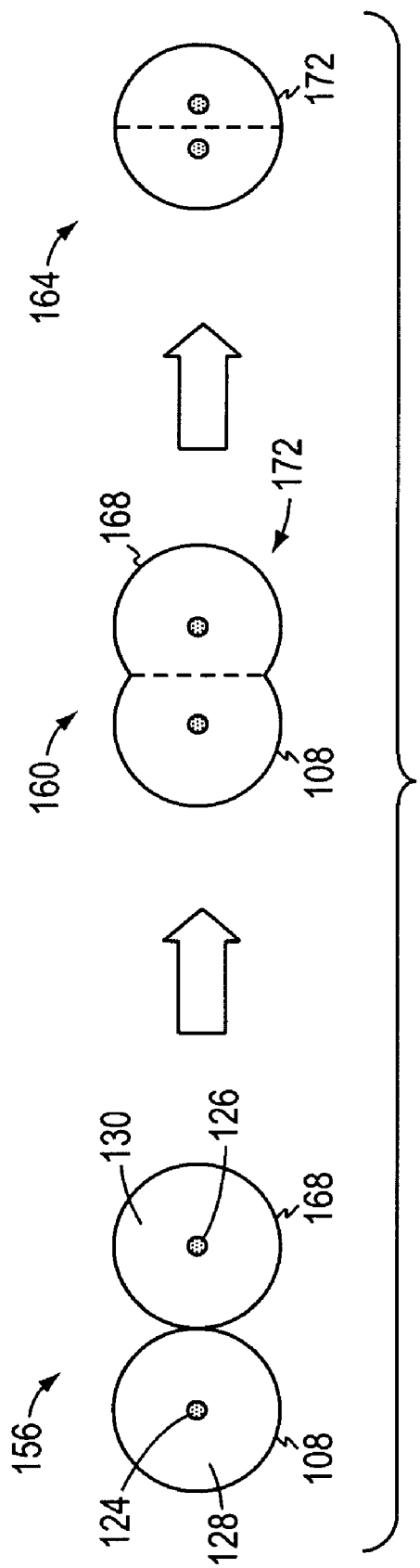
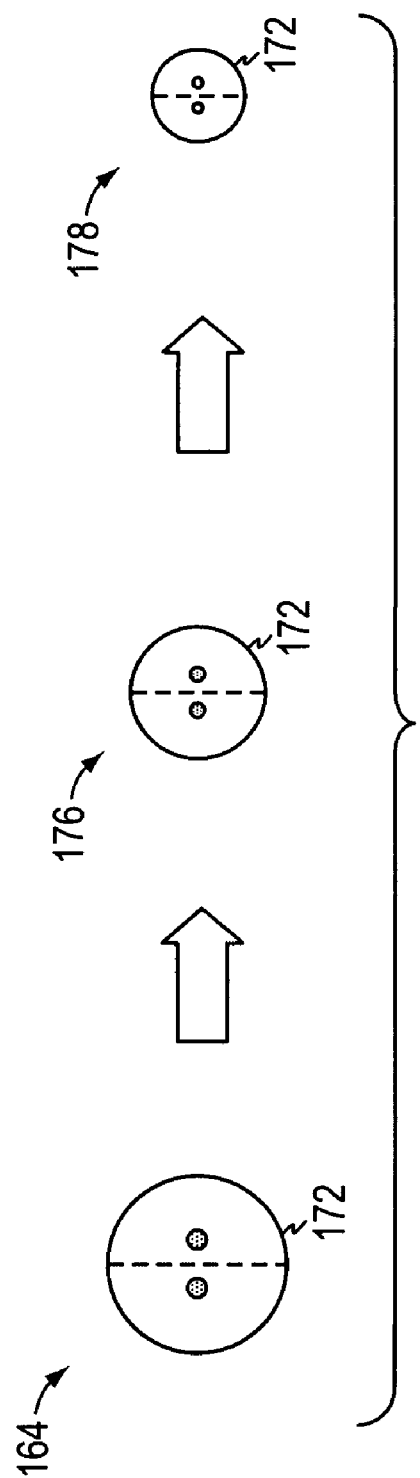

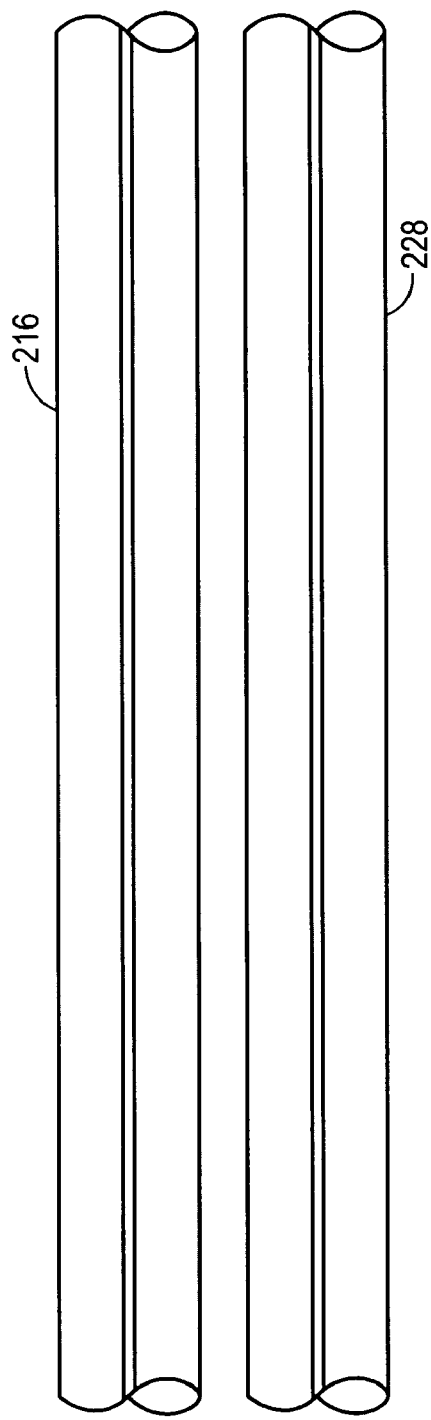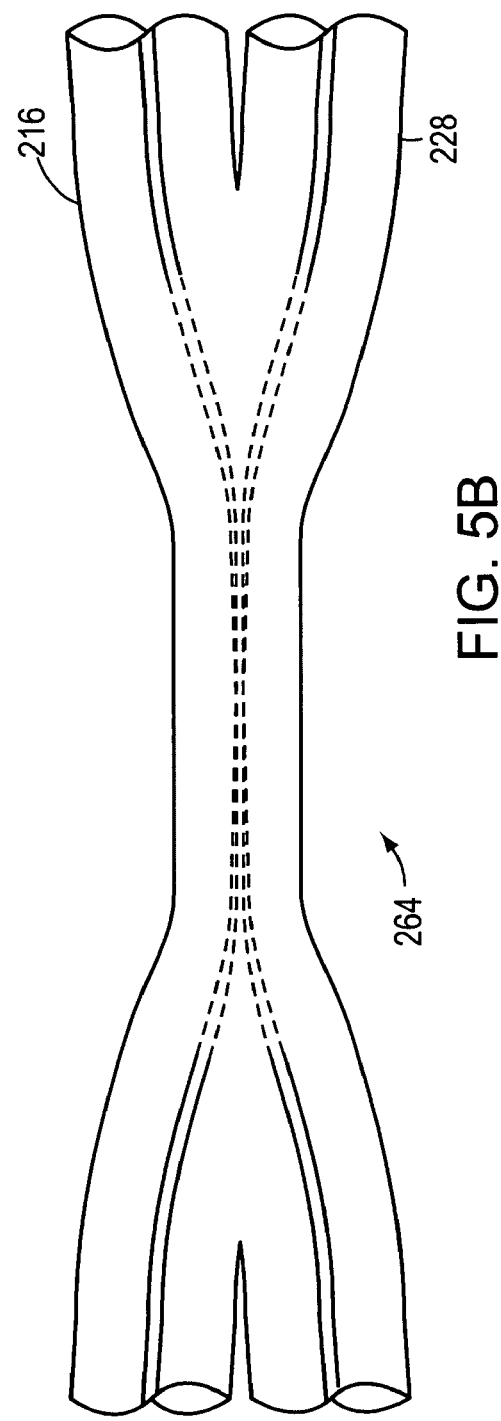

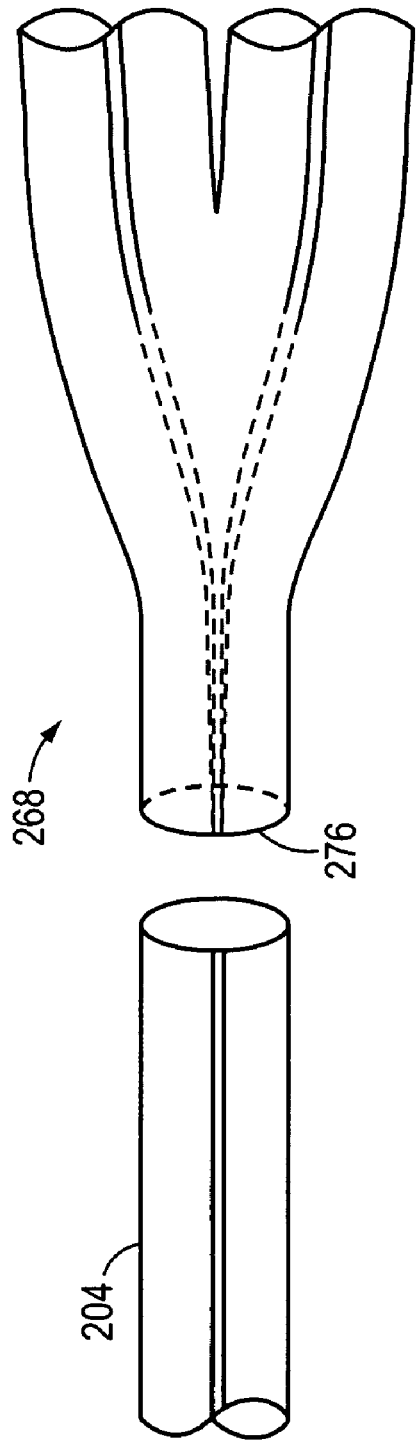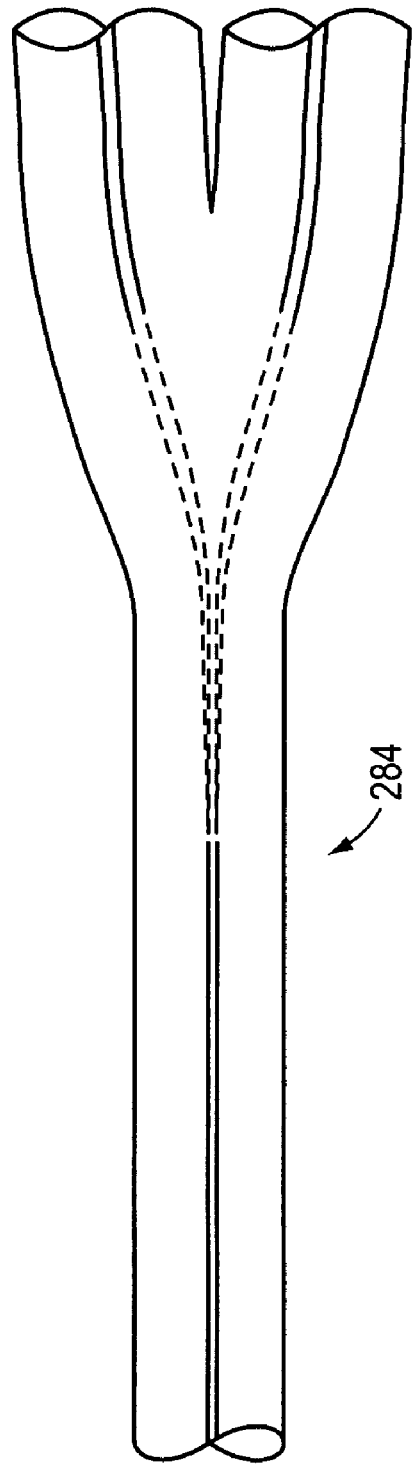
FIG. 7A
FIG. 7B

ACHROMATIC FIBER-OPTIC POWER SPLITTER AND RELATED METHODS

CROSS-REFERENCE TO RELATED APPLICATIONS

This application claims the benefits of and priority to U.S. provisional patent application Ser. No. 60/426,987 filed on Nov. 15, 2002, the entire disclosures of which are herein incorporated by reference.

GOVERNMENT RIGHTS

The subject matter described herein was supported in part by The United States Navy, Contract No. N00030-01-C-0022. The U.S. Government has certain rights in this invention.

FIELD OF THE INVENTION

The invention relates generally to optical splitters, and more particularly to achromatic optical splitters.

BACKGROUND OF THE INVENTION

Power splitters and couplers have important military and commercial telecommunications and optical applications. The most common power splitters based on optical fiber are directional couplers. Fused-fiber directional couplers propagate two modes along multiple optical fibers. One of the two modes is an even spatial function. This mode is also the lowest order mode. The other mode is an odd spatial function. Although the light that enters the coupler may be single mode, two modes evolve as the light travels along the coupler, and the modes interfere in the coupling region. If the length or temperature of the coupling region of the coupler changes, or the polarization or wavelength of the light traveling the coupler changes, interference between the modes will change. Consequently, the spectral shape of the light input into the fiber and/or the power split ratio (the ratio of output intensity from a first channel to the output intensity of a second channel) will change as well, which inhibits the performance and reliability of the signal output from the coupler.

Polished fiber directional couplers utilize evanescent coupling between adjacent waveguides. In addition, three port Y-splitters are planar waveguides that use a single waveguide split into multiple paths. Planar Y-splitters suffer from power split ratios that are sensitive to the polarization state of the incoming light. Planar Y-splitters also do not preserve the spectral profile, nor the polarization state of the input light.

SUMMARY OF THE INVENTION

The invention, in one aspect, relates to an achromatic power splitter formed from multiple optical fibers. The achromatic power splitter of the invention, preferably, operates single mode and does not form higher order modes. This permits the device to operate substantially insensitive to wavelength and to operate broadband. The achromatic power splitter, in one embodiment, is designed so that only one type of mode, i.e., the lowest-order even mode, is present in the input region. The power split ratio of the achromatic power splitter of the invention is insensitive to changes in the wavelength and polarization of the input light, as well as environmental changes, e.g., temperature.

According to one feature, light from the output fibers has substantially the same polarization state and substantially the same spectral profile as the input light. According to another one feature, the power split ratio is substantially unchanged if the splitter is exposed to ionizing radiation, e.g., gamma- rays or X-rays.

In one aspect, the invention provides a method of forming an optical device. The method includes fusing portions of a plurality of optical fibers to form a fused fiber region, and cleaving the fused fiber region, thereby forming a fused end. A spliced fiber is formed by splicing an end of an independent optical fiber to the fused end such that the independent optical fiber is in optical communication with the first and second optical fibers. Reducing a cross-section of the spliced fiber forms an optical device propagating light with the lowest- order even mode. At least one of the optical fibers may be single-mode fiber. In one embodiment, the reducing step includes heating and pulling the spliced fiber. The method may include reducing the cross-section of the spliced fiber to less than about 50 $\mu$m.

In various embodiments, the method includes forming the optical device such that the ratio of output from at least two of the plurality of optical fibers is independent of wavelength of light input into the independent optical fiber, polarization of light input into the independent optical fiber, temperature of the optical device, and/or exposure of the optical device to ionizing radiation. The method may include forming the optical device such that the spectral profile of light output from at least one of the plurality of optical fibers and is substantially the same as the spectral profile of light input into the independent optical fiber. In one embodiment, a portion of the optical device is disposed in a casing.

In another aspect, the invention provides another method of forming an optical device. The method includes forming a hybrid fiber by splicing a coreless optical fiber to a first optical fiber, and fusing a portion of a second optical fiber to a portion of the hybrid fiber to form a fused fiber region. Reducing a cross-section of the fused fiber region forms an optical device propagating light with the lowest-order even mode. In one embodiment, at least one of the first and second optical fibers is a single-mode fiber. In one embodiment, the reducing step includes heating and pulling the fused fiber region.

In various embodiments, the method includes forming the optical device such that the ratio of output from the first optical fiber to output of a first end of the second optical fiber is independent of wavelength of light input into a second end of the second optical fiber, polarization of light input into a second end of the second optical fiber, temperature of the optical device, and/or exposure of the optical device to ionizing radiation. The method may include forming the optical device such that the spectral profile of light output from the first optical fiber and a first end of the second optical fiber is substantially the same as the spectral profile of light input into a second end of the second optical fiber. In one embodiment, the fused fiber region includes the second optical fiber and at least two hybrid fibers prior to the reducing the fused fiber region.

In yet another aspect, the invention provides an optical device including an input region, a fused fiber region in optical communication with the input region, and an output region in optical communication with the fused fiber region. The input region includes a portion of a first optical fiber and a portion of a coreless optical fiber, while a portion of the fused fiber region has a diameter less than that of the input region. The output region includes a portion of the first optical fiber and a second optical fiber. The input region, the fused fiber region, and the output region all propagate the lowest-order even mode. In one embodiment, the input region includes a first optical fiber and portions of at least two coreless optical fibers, and the output region includes one more optical fiber than the number of coreless optical fibers.

In still another aspect, the invention provides an apparatus including a first optical fiber spliced to a fused end of at least two optical fibers. The first optical fiber and the fused end form a spliced fiber region, and the optical fibers only propagate light with the lowest-order even mode.

Other aspects and advantages of the invention will become apparent from the following drawings, detailed description, and claims, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. The drawings are not necessarily to scale, emphasis instead generally being placed upon illustrating the principles of the invention.

FIG. 2 depicts exemplary cross-sectional views of the formation of the achromatic power splitter shown in FIG. 1.

FIG. 3 shows additional cross-sectional views of the formation of the achromatic power splitter shown in FIG. 1.

FIG. 5A depicts two optical fibers prior to being fused together.

FIG. 5B shows a fused fiber.

FIG. 7A shows an exemplary embodiment of an optical fiber and a cleaved fiber section prior to being spliced together.

FIG. 7B shows an illustrative embodiment of a spliced fiber.

DETAILED DESCRIPTION OF THE INVENTION

For the purposes of this application, the achromatic power splitter is achromatic in at least two respects: the output power split ratio of the splitter is independent of the input wavelength and the spectral profile of the light that exits the splitter is substantially the same as that of the input light. Furthermore, as used herein, the term "splitter" refers to splitters, couplers, taps and switches. In addition, as used herein, "light" refers to the optical part of the electromagnetic spectrum between about 200 nm and about 40,000 nm.

Figure 1:
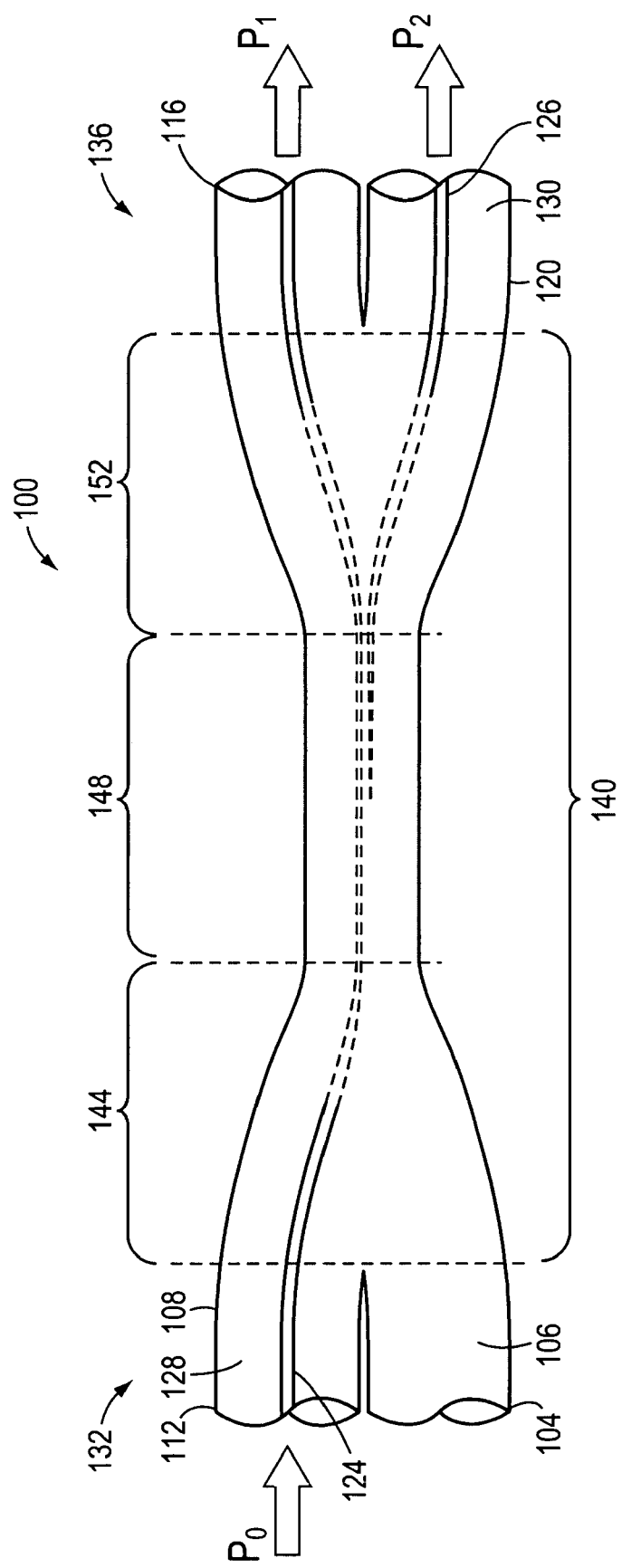
FIG. 1 depicts an illustrative embodiment of an achromatic power splitter.

FIG. 1 depicts an illustrative embodiment of an achromatic power splitter 100 that includes a coreless optical fiber 104 having cladding 106, a first optical fiber 108 having a first end 112 and a second end 116, and a second optical fiber 120. The first and second optical fibers 108, 120 include core regions 124, 126, respectively, and cladding regions 128, 130, respectively. The coreless optical fiber 104 and the first end 112 of the first optical fiber 108 form an input region 132 for the achromatic power splitter 100, and the second end 116 of the first optical fiber 108 and the second optical fiber 120 form an output region 136. The region where the three fibers 104, 108, 120 are coalesced together forms a fused fiber region 140, which itself includes a first tapered region 144, a central region 148, and a second tapered region 152.

The achromatic power splitter 100 operates in a single mode state because the input region 132 operates in a single-mode state. As described above, single-mode operation enhances the wavelength insensitivity of the achromatic power splitter 100. Preferably, the first and second optical fibers 108, 120 are single-mode fibers, e.g., SMF-28® fibers available from Corning, Inc., although in various embodiments multi-mode fibers may be used. The coreless optical fiber 104 may be a pure silica fiber, e.g., available from Lucent Technologies. In various embodiments, one or more of the optical fibers 104, 108, 120 includes a coating disposed on the cladding region. The coating may be removed prior to formation of the achromatic power splitter 100.

In operation, power $P_o$ in the form of light is input into the input region 132. The light propagates through the core 124 of the first optical fiber 108. As the light propagates through the first tapered region 144, the core 124 reduces in diameter, and the light begins to penetrate further into the cladding regions 106, 128 of the coreless fiber 104 and the first optical fiber 108, respectively. For example, for a SMF-28® fiber having a diameter of about 125 $\mu$m and a core diameter of about 8.2 $\mu$m and carrying light with a wavelength of about 1550 nm, about 80% of the light is confined within the core. As the SMF-28® fiber is drawn down to smaller diameters, less light is confined to the core.

In the central region 148, the diameter of the core 124 is reduced such that the cladding regions 106, 128 primarily guide the light. As the light enters the second tapered region 152, the diameters of the cores 124, 126 of the first and second optical fibers 108, 120 increase and begin to guide the light once again. Using techniques described in more detail below, the relative splitting of light between the two optical fibers 108, 120 may be controlled. This splitting is reflected in the power split ratio of powers $P_1$, $P_2$ exiting their respective optical fibers 108, 120 in the output region 136.

The coreless optical fiber 104 does not transmit light into or out of the achromatic power splitter 100. Indeed, a power splitter may be formed without a coreless optical fiber, but it then becomes more difficult to process the splitter. The coreless optical fiber 104 provides additional material to the fused region 140 during formation of the tapers and permits a nearly symmetric profile of the achromatic power splitter 100. Without the coreless optical fiber, the integrity of the fused region becomes more difficult to maintain because there is less material on the input side of the splitter than the output side.

In addition, after forming the achromatic power splitter 100, the cladding regions 106, 128 of the coreless optical fiber 104 and the first optical fiber 108, respectively, may be shaved down in the first tapered region 144 so that the core 124 is located in the center of the fibers 104, 108, instead of off-center in the first tapered region 124.

A splice machine and a workstation for making fused-fiber couplers may be used to form the power splitters. FIG. 2 depicts exemplary cross-sectional views 156, 160, 164 of the achromatic power splitter 100 shown in FIG. 1. The coreless optical fiber 104 is spliced to the second optical fiber 120 to form a hybrid fiber 168. View 156 is a section of the first optical fiber 108 and the hybrid fiber 168 in the fused fiber region 140. Note that the core 126 shown in view 156 is that of the second optical fiber 120, so this section represents a second optical fiber portion of the hybrid fiber 168.

The first optical fiber 108 and the hybrid fiber 168 are fused so that the two fibers coalesce to form a fused fiber 172 in the fused fiber region 140. The progression of the fusing is shown in views 160 and 164. In some embodiments, the average diameter of the fused fiber 172 is equal to or larger than the diameter of the first optical fiber 108 and/or the hybrid fiber 168. For example, starting fibers with diameters of about 80 μm or about 125 μm may be used. In some embodiments, the fused fiber 172 in the fused fiber region 140 has a substantially circular cross-section over a length of about 15 mm.

During fusing of the fibers, the fibers may be rotated (not twisted) while being fused. The rotations may be in about 180 degrees increments. Low speed pulls and long heating regions are preferred to minimize size reduction, and therefore retain a fused fiber 172 with a diameter greater than or equal to that of the starting fibers. For example, for an about 125 μm fiber, a pulling rate of about 1.0 mm/min and a heating region of about 5 mm may be employed to pull the fibers a total of about 20 mm. Low flame temperatures also minimize size reduction. A typical flame temperature, e.g., for fusing silica, is about 1,500° C.

The diameter of the fused fiber 172 is then reduced to form the achromatic power splitter 100. FIG. 3 shows a progression of cross-sectional views 164, 176, 178 of the fused fiber 172 during formation of the achromatic power splitter 100 shown in FIG. 1. Reducing techniques known in the art, such as heating and/or pulling (not order specific) down the diameter of the fused fiber 172, are used. For a power splitter with starting fibers with diameters of about 125 μm, the final dimension, shown in view 178, is about 50 μm. For a power splitter with starting fibers with diameters of about 80 μm, the final dimension, shown in view 178, is about 32 μm.

In addition, the output of the achromatic power splitter 100 may be monitored during formation of the splitter. This may include monitoring power versus time and/or measuring excess losses during the fusing and pulling processes. By monitoring the output, the splitting characteristics may be optimized. Power splitters with virtually any splitting ratio may be formed, e.g., from 99:1 to 50:50, although a splitting ratio between about 60:40 and about 50:50 is preferred.

When reducing the diameter of the fibers, higher pull speeds and shorter heating region, as compared to those parameters used when fusing the fibers, are used to increase size reduction in the central region 148, i.e. finish with a fused fiber 172 with a diameter about 2.5 times smaller than that of the starting fibers. In addition, a higher flame temperature may be used to concentrate size reduction in the central region 148.

In another embodiment, the achromatic power splitter 100 may be formed with an output region having three or more optical fibers. In such an embodiment, the corresponding input region includes a first optical fiber and two or more coreless optical fibers, e.g., the number of coreless optical fibers forming the input region equals one fewer than the number of optical fibers forming the output region. The techniques described above are used to form this embodiment of the achromatic power splitter.

Figure 4:
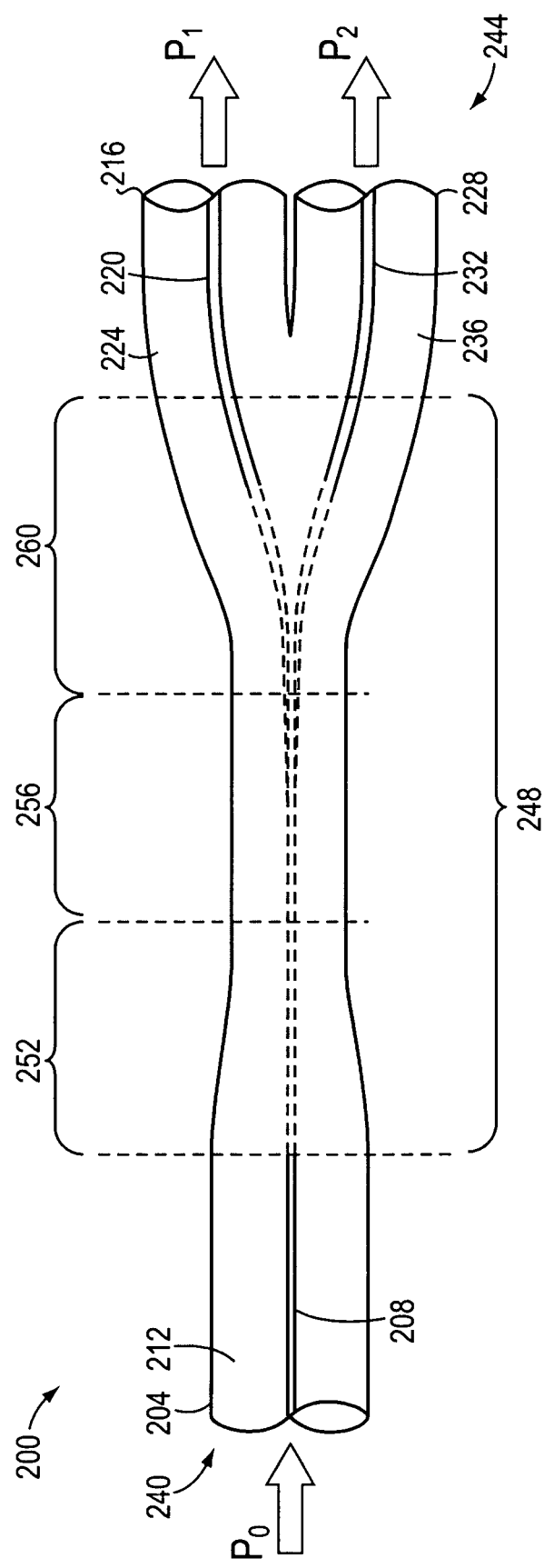
FIG. 4 depicts another exemplary embodiment of an achromatic power splitter.

FIG. 4 shows an exemplary embodiment of an achromatic power splitter 200 that includes a first optical fiber 204 having a core 208 and a cladding region 212, a second optical fiber 216 having a core 220 and a cladding region 224, and a third optical fiber 228 having a core 232 and a cladding region 236. The first optical fiber 204 (also referred to as an "independent" optical fiber) forms the input region 240, while the second and third optical fibers 216, 228 form the output region 244. The region where the three fibers 204, 216, 228 are coalesced together forms a fused fiber region 248, which itself includes a first tapered region 252, a central region 256, and a second tapered region 260.

As described above with reference to the achromatic power splitter 100, the achromatic power splitter 200 operates in a single mode state because the input region 240 operates in a single-mode state. As described above, single-mode operation enhances the wavelength insensitivity of the achromatic power splitter 200. Preferably, all the optical fibers 204, 216, 228 are single-mode fibers, e.g., SMF-28® fibers, although in various embodiments multi-mode fibers may be used. In some embodiments, one or more of the optical fibers 204, 216, 228 include a coating disposed on the cladding region of the fiber. The coating may be removed prior to formation of the achromatic power splitter 200.

In operation, power $P_o$ in the form of light is input into the input region 240. The light propagates through the core 208 of the first optical fiber 204. As the light propagates through the first tapered region 252, the core 208 reduces in diameter, and the light begins to penetrate further into the cladding region 212 of the first optical fiber 204. In the central region 256, the diameters of the cores 208, 220, 232 of the respective fibers are reduced such that the cladding regions 212, 224, 236 guide the light. As the light enters the second tapered region 260, the diameters of the cores 220, 232 of the second and third optical fibers 216, 228, respectively, increase and begin to guide the light once again. As described above, the relative splitting of light between the second and third optical fibers 216, 228 may be controlled. This splitting is reflected in the relative power or intensity of powers $P_1$, $P_2$ exiting their respective optical fibers 108, 120 in the output region 244.

A splice machine, a cleaving machine, and a workstation for making fused-fiber couplers may be used to form the power splitters. To summarize the formation process, two optical fibers are fused together to form a substantially circular cross-section, and the fused fiber is cleaved at or near the center. Another optical fiber is then spliced to one of the cleaved halves to form a spliced fiber. The diameter of the spliced fiber in the spliced region is then reduced to the working diameter.

FIG. 5A depicts the second optical fiber 216 and the third optical fiber 228 prior to fusing. At least a portion of each fiber 216, 228 is fused together to form a fused fiber 264, as shown in FIG. 5B. The first and second optical fibers 216, 228 coalesce to form a substantially circular cross-section with a diameter approximately equal to the diameter of one of the starting fibers. For a starting fiber with a diameter of about 125 μm, the diameter of the central fused section is between about 100 μm and about 150 μm. The length of the central fused section is about 15 mm. In a preferred embodiment, the substantially circular cross-section extends for a length of about 10 mm. The output of the fused fiber 264 may be monitored while the fibers are being fused, as described above.

During fusing of the fibers, the fibers may be rotated (not twisted) while being fused. The rotations may be in about 180 degrees increments. As described above, low speed pulls, long heating regions, and low flame temperatures are preferred during fusing to minimize size reduction of the fused fiber 264.

Figure 6:
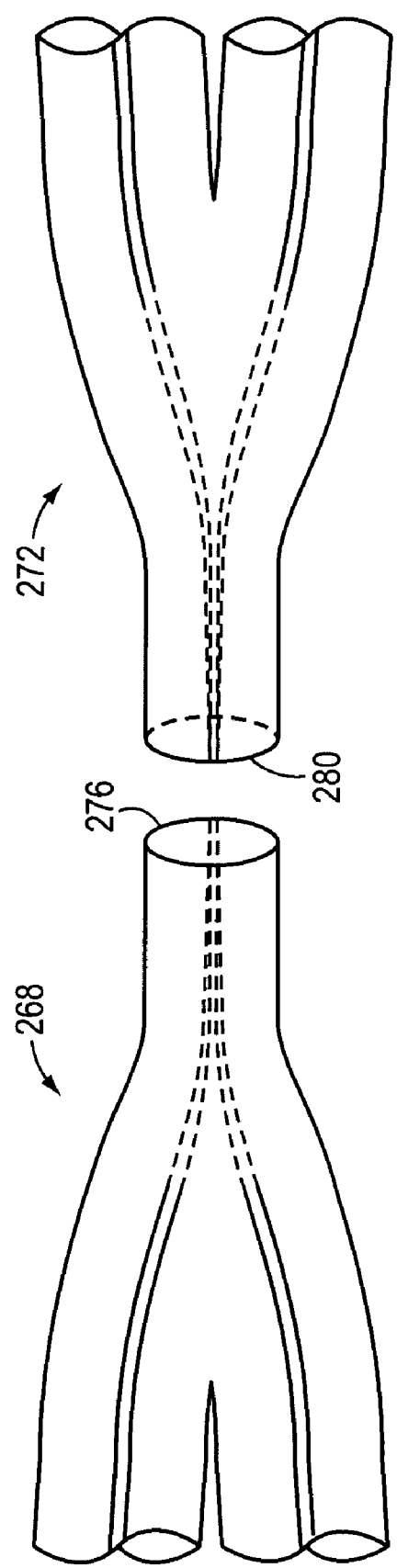
FIG. 6 shows an illustrative embodiment of a fused fiber cleaved into two sections.

FIG. 6 shows an illustrative embodiment of the fused fiber 264 cleaved into a first section 268 and a second section 272, each section having a fused end 276, 280 respectively. The fused fiber 264 is cleaved at or about the center of the fused region. Preferably, each fused end 276, 280 is examined, e.g., with a microscope, to determine the quality of the cleave. In another embodiment, the achromatic power splitter 200 is formed with an output region having three or more optical fibers, i.e., a fused end 276, 280 of the fused fiber 264 includes three or more optical fibers.

A suitable section 268 or 272 of the fused fiber 264 that was cleaved is then spliced to the first optical fiber 204 shown in FIG. 4 above. FIG. 7A shows an exemplary embodiment of the first optical fiber 204 and the first section 268 prior to splicing the first optical fiber 204 to the fused end 276 of the first section 268. FIG. 7B shows an illustrative embodiment of a spliced fiber 284.

The diameter of the spliced fiber 284 shown in FIG. 7B is then reduced to form the achromatic power splitter 200 shown in FIG. 4. Reducing may be done by heating and pulling (not order specific). For a power splitter with starting fibers with diameters of about 125 $\mu$m, the final dimension of the central region 256 shown in FIG. 4 is about 50 $\mu$m. For a power splitter with starting fibers with diameters of about 80 $\mu$m, the final dimension of the central region 256 is about 32 $\mu$m.

In addition, the output of the achromatic power splitter 200 may be monitored during formation of the splitter. This may include monitoring power versus time and/or measuring excess losses during the fusing and pulling processes. As described above, by monitoring the output, the splitting characteristics may be optimized. Power splitters with virtually any splitting ratio may be formed, e.g., from 99:1 to 50:50, although a splitting ratio between about 60:40 and about 50:50 is preferred.

When reducing the diameter of the fibers, higher pull speeds and shorter heating regions, as compared to those parameters used when fusing the fibers, are used to increase size reduction in the central region 256. In addition, a higher flame temperature is used to concentrate size reduction in the central region 256.

The achromatic power splitters 100, 200 are designed so that they will carry light over a fixed range of wavelengths. The most useful range of wavelengths for commercial applications of fiber optics is between about 600 nm and about 1,800 nm. In one preferred embodiment, the fixed range of wavelengths is between about 1,300 nm and about 1,600 nm, although splitters may be formed with a different fixed range of wavelengths, e.g., between about 800 nm and about 1,000 nm. In various embodiments, the cladding region or the core of one or more of the optical fibers may be doped.

The power split ratio is substantially insensitive to changes in the input light and/or environment. Because the way the power is divided depends almost exclusively on the geometry of the core and the cladding, the power split ratio is substantially insensitive to 1) changes in the polarization of the input light, 2) changes in the temperature of the device, and 3) exposure to ionizing radiation like gamma-ray and X-rays.

Over the range of 1,300 nm to 1,600 nm, variation in power split ratio is less than about 1%. The sensitivity of the splitters 100, 200 to polarization changes is better than about −30 dB. The splitters 100, 200 are typically operated in the temperature range of about 5° C. to about 50° C., although the splitters may be operated at higher and lower temperatures depending on the application.

Figure 8:
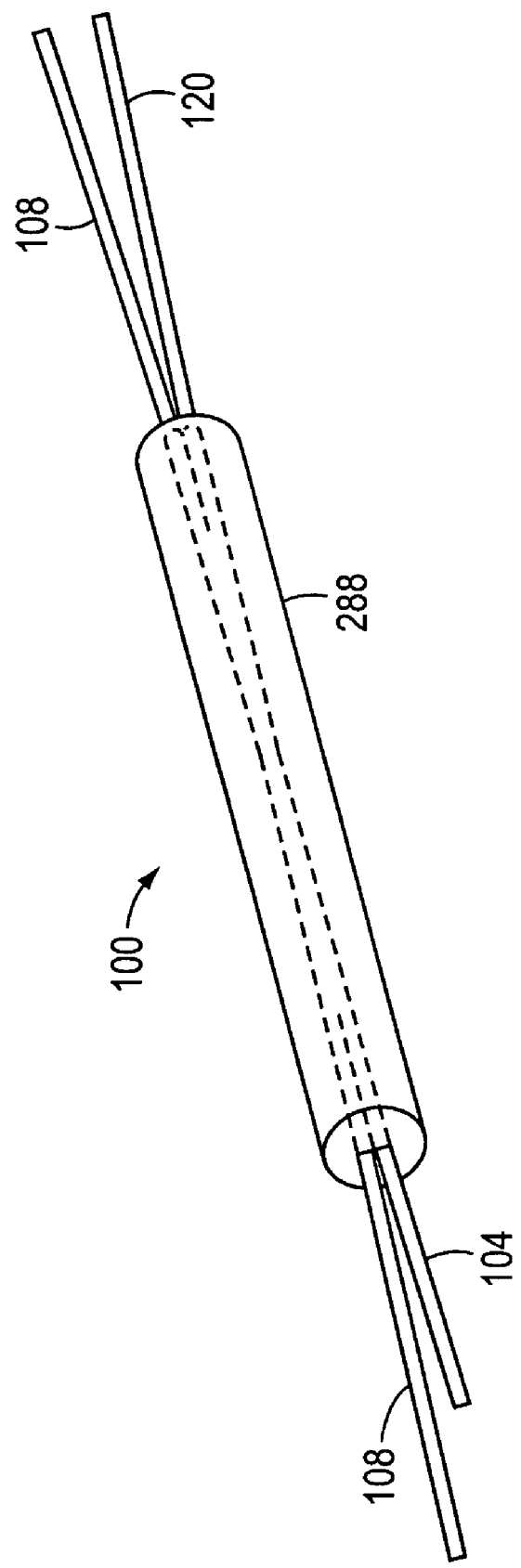
FIG. 8 shows an exemplary embodiment of an achromatic power splitter disposed within a protective casing.

In some embodiments, the achromatic power splitter 100, 200 is epoxied to a silica substrate and/or enclosed in a casing for protection. FIG. 8 shows an exemplary embodiment of the achromatic power splitter 100 disposed within a casing 288, e.g., a metal cylinder. Typical dimensions for a metal cylinder are about 60 mm in length by about 5 mm in diameter.

While the invention has been particularly shown and described with reference to specific illustrative embodiments, it should be understood that various changes in form and detail may be made without departing from the spirit and scope of the invention as defined by the appended claims.

What is claimed is:

1. A method of forming an optical device, the method comprising:
    fusing portions of a plurality of optical fibers to form a fused fiber region;
    cleaving the fused fiber region to form a fused end;
    forming a spliced fiber by splicing an end of an independent optical fiber to the fused end such that the independent optical fiber is in optical communication with the plurality of optical fibers; and
    reducing a cross-section of the spliced fiber to form an optical device propagating light with a lowest-order even mode.

2. The method of claim 1, wherein at least one of the independent optical fiber and the plurality of optical fibers is a single-mode fiber.

3. The method of claim 1, wherein the reducing step comprises heating and pulling the spliced fiber.

4. The method of claim 1 further comprising reducing the cross-section of the spliced fiber to less than about 50 $\mu$m.

5. The method of claim 1 further comprising forming the optical device such that the ratio of output from at least two of the plurality of optical fibers is independent of at least one of wavelength of light input into the independent optical fiber, polarization of light input into the independent optical fiber, temperature of the optical device, and exposure of the optical device to ionizing radiation.

6. The method of claim 1 further comprising forming the optical device such that the spectral profile of light output from at least one of the plurality of optical fibers and is substantially the same as the spectral profile of light input into the independent optical fiber.

7. The method of claim 1 further comprising disposing a portion of the optical device in a casing.

8. A method of forming an optical device, the method comprising:
    forming a hybrid fiber by splicing a coreless optical fiber to a first optical fiber;
    fusing a portion of a second optical fiber to a portion of the hybrid fiber to form a fused fiber region; and
    reducing a cross-section of the fused fiber region to form an optical device propagating light with a lowest-order even mode.

9. The method of claim 8, wherein at least one of the first and second optical fibers is a single-mode fiber.

10. The method of claim 8, wherein the reducing step comprises heating and pulling the fused fiber region.

11. The method of claim 8 further comprising reducing the cross-section of the spliced fiber to less than about 50 $\mu$m.

12. The method of claim 8 further comprising forming the optical device such that the ratio of output from the first optical fiber to output of a first end of the second optical fiber is independent of at least one of wavelength of light input into a second end of the second optical fiber, polarization of light input into a second end of the second optical fiber, temperature of the optical device, and exposure of the optical device to ionizing radiation.

13. The method of claim 8 further comprising forming the optical device such that the spectral profile of light output from the first optical fiber and a first end of the second optical fiber is substantially the same as the spectral profile of light input into a second end of the second optical fiber.

14. The method of claim 8 further comprising disposing a portion of the optical device in a casing.

15. The method of claim 8, wherein the fused fiber region comprises the second optical fiber and at least two hybrid fibers prior to the reducing step.

16. An optical device comprising:
   an input region, the input region comprising a portion of a first optical fiber and a portion of a coreless optical fiber;
   a fused fiber region in optical communication with the input region, a portion of the fused fiber region having a diameter less than that of the input region; and
   an output region in optical communication with the fused fiber region, the output region comprising a portion of the first optical fiber and a second optical fiber;
   wherein the input region, the fused fiber region, and the output region propagate a lowest-order even mode.

17. The optical device of claim 16, wherein at least one of the first and second optical fibers is a single-mode fiber.

18. The optical device of claim 16, wherein the cross-section of the fused fiber region is less than about 50 $\mu$m.

19. The optical device of claim 16, wherein the ratio of output from the first optical fiber to output of a first end of the second optical fiber is independent of at least one of wavelength of light input into a second end of the second optical fiber, polarization of light input into a second end of the second optical fiber, temperature of the optical device, and exposure of the optical device to ionizing radiation.

20. The optical device of claim 16, wherein further the spectral profile of light output from the first optical fiber and a first end of the second optical fiber is substantially the same as the spectral profile of light input into a second end of the second optical fiber.

21. The optical device of claim 16, wherein the optical device comprises a casing.

22. The optical device of claim 16, wherein:
   the input region comprises a first optical fiber and portions of at least two coreless optical fibers; and
   the output region comprises one more optical fiber than the number of coreless optical fibers.

23. An apparatus comprising a first optical fiber spliced to a fused end of at least two optical fibers, the first optical fiber and the fused end forming a spliced fiber region, the optical fibers only propagating light with a lowest-order even mode.

24. The optical device of claim 23, wherein at least one of the optical fibers is a single-mode fiber.

25. The optical device of claim 23, wherein the cross-section of the spliced fiber region is less than about 50 $\mu$m.

26. The optical device of claim 23, wherein the ratio of output from the at least two optical fibers is independent of at least one of wavelength of light input into the first optical fiber, polarization of light input into the first optical fiber, temperature of the optical device, and exposure of the optical device to ionizing radiation.

27. The optical device of claim 23, wherein further the spectral profile of light output from the at least two optical fibers is substantially the same as the spectral profile of light input into the first optical fiber.

28. The optical device of claim 23, wherein the optical device comprises a casing.

* * * * *